March 14, 1933.  S. B. BUSSINGER  1,901,224

PISTON RING COMPRESSOR

Filed Jan. 6, 1932

INVENTOR:
Selma B. Bussinger
By E J Andrews
Atty.

Patented Mar. 14, 1933

1,901,224

UNITED STATES PATENT OFFICE

SELMA B. BUSSINGER, OF SAN LEANDRO, CALIFORNIA

PISTON RING COMPRESSOR

Application filed January 6, 1932. Serial No. 584,941.

Figure 1:
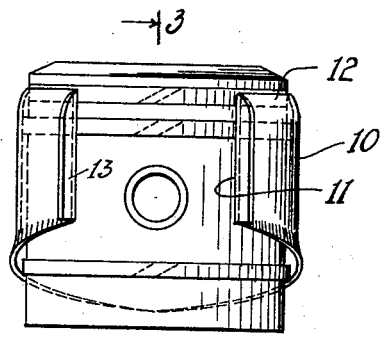
Figure 2:
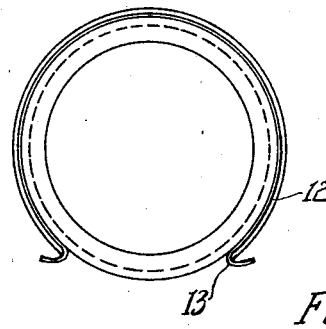
Figure 3:
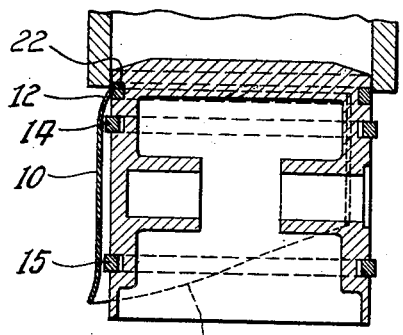
Figure 5:
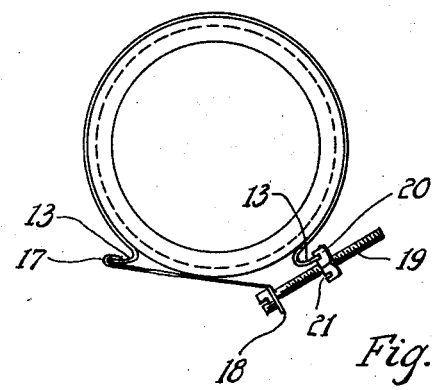
Figure 4:
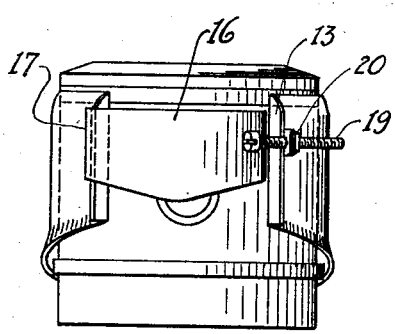

This invention relates to piston ring compressors, which may be used when it is desired to insert the piston in the cylinder without the interference of the projecting piston rings. The objects of the invention are to provide very convenient means for compressing the rings, so arranged as to apply the compressive force on the rings successively as they are being inserted into the cylinder, the compressive force being entirely concentrated on the particular ring that is to be inserted. A further object is to provide means that are easily removed from the piston connecting rod when the piston has been inserted. Another object is to provide additional means for increasing very materially the compressive force in case of piston rings which resist compression abnormally, particularly those having additional spring means tending to force the ring when in place in the cylinder more firmly against the sides of the cylinder. Other objects of the invention will be apparent from a consideration of the accompanying drawing and the following description thereof:

Of the drawing, Fig. 1 is an elevation of a piston, with my compressor mounted thereon in the normal position for inserting the piston in the cylinder; Fig. 2 is a plan view of the piston and sleeve; Fig. 3 is a central sectional view of the same, showing the piston entering into the cylinder; Fig. 4 is an elevation of the piston and sleeve with the additional compressing means applied; and Fig. 5 is a plan view of the elements of Fig. 4.

As is well understood, when a piston is to be inserted in a cylinder, the piston rings ordinarily project outwardly beyond the surface of the piston and must be compressed inwardly so as to be at least flush with the surface of the piston before the piston can be inserted in the cylinder. To so compress the rings, I provide the sleeve 10, which is made of suitable material, such as steel, so that it can be properly tempered so as to yield resiliently very materially without bending. The sleeve is of sufficient thickness and strength to compress the rings of the piston inwardly, so as to avoid interference with the cylinder when properly placed.

In preparing to insert the piston, the open side 11 of the sleeve is pressed downwardly on the piston with the open portions of the rings facing the open portion of the sleeve. The edge 12 of the sleeve is pressed against the ring 22 which is to be first inserted in the cylinder. The edges 13 of the opening of the cylinder are preferably rounded, as indicated, so that the sleeve will slip over the piston when pressed downwardly with sufficient force.

When the sleeve is in the proper position, it is pressed downwardly until it slips over the piston; and the upper edge 12 being curved inwardly, as indicated in Fig. 3, the ring in contact therewith will be pressed inwardly so that it may be passed into the cylinder, as indicated. As the piston is forced upwardly into the cylinder, the sleeve 10 will be pressed downwardly by the cylinder and the edge 12 will pass downwardly, the inwardly inclined edge 12 pressing the next ring 14 inwardly until the edge of the sleeve rests on the ring 14, and this ring will then be pressed into position for passing into the cylinder. Similarly with the ring 15 or other rings that may be on the piston. The sleeve will then drop off of the piston and may be readily removed by passing the piston connecting rod through the opening 11.

If it should be found that the resistance of the ring to compression is so great that it is not sufficiently pressed into the piston groove to pass freely into the cylinder, the auxiliary compression member 16 may be used. This member is preferably composed of sheet iron or steel, and it has a hook portion 17 on one end, which is adapted to hook over the rounded edge 13 of the compressor sleeve. The other end of the member has a flange 18 through which passes a bolt 19. This bolt is threaded into a nut 20 which has grooves 21 formed therein. One of the grooves is adapted to pass over the edge 13, and the bolt is then screwed inwardly into the nut, drawing on the flange 18 and pulling the two edges of the sleeve firmly together until the ring is compressed sufficiently to pass freely into the cylinder.

The lower edge 23 of the sleeve is made inclined somewhat as indicated, and also bends outwardly so that the sleeve is more conveniently applied to the piston, and the lower edge will not interfere with the rings as the sleeve is being forced downwardly on the piston by the cylinder. It will be noted that the sleeve comes in contact with the piston, or the piston rings, when in operative position, only with the ring that is to be inserted in the cylinder. Hence, the entire compressive force of the sleeve is directed on the single ring. By the form and arrangement described, it is necessary only to place the sleeve on the first ring that is to be inserted, and the piston may quickly be pushed entirely into the cylinder, as the sleeve will automatically compress the rings successively as they are to pass into the cylinder, so that the entire process of applying the sleeve and passing the piston entirely into the cylinder takes but a few seconds of time, except where the auxiliary member needs to be applied, and this is very rarely.

I claim as my invention:

1. A piston ring compressor comprising a cylindrically-shaped sleeve open on one side and composed of spring sheet metal, the edges of said opening being spaced a material distance apart, one of the curved ends of the sleeve being bent inwardly and the other being bent outwardly, each of the said opening edges having an outwardly and backwardly extending flange thereon, means adapted to coact with each of said flanges and to draw them together, said means comprising an arcuate band having a hook on one end adapted to hook onto one of the flanges of the sleeve, said band having a flange on its other end, and means for drawing together said latter flange and the other flange of the compressor.

2. A piston ring compressor as claimed in claim 1, in which said band flange has a hole therein, and said latter means comprising a nut having a slot therein adapted to receive the other sleeve flange, and including a bolt adapted to pass through said opening and screw into said nut.

In testimony whereof, I hereunto set my hand.

SELMA B. BUSSINGER.